United States Patent
Stolz

(10) Patent No.: US 7,725,231 B2
(45) Date of Patent: May 25, 2010

(54) METHOD FOR DISPLACING A MOVABLE PART AND SLIDING ROOF SYSTEM FOR CARRYING OUT SUCH A METHOD

(75) Inventor: Christian Stolz, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 583 days.

(21) Appl. No.: 11/519,591

(22) Filed: Sep. 11, 2006

(65) Prior Publication Data

US 2008/0065296 A1  Mar. 13, 2008

(51) Int. Cl.
  *G06F 7/00* (2006.01)
  *B60J 7/043* (2006.01)
(52) U.S. Cl. .................................... 701/49; 296/216.01
(58) Field of Classification Search .................. 701/49, 701/36, 1; 160/188, 189; 296/165, 213, 296/214, 216.03, 216.04, 221, 222, 223; 318/280, 282, 466; 49/199, 200
See application file for complete search history.

(56) References Cited

U.S. PATENT DOCUMENTS

| | | | |
|---|---|---|---|
| 4,891,764 A * | 1/1990 | McIntosh | 700/183 |
| 6,021,691 A * | 2/2000 | Wilkerson, Jr. | 74/547 |
| 6,163,125 A | 12/2000 | Bernauer et al. | |
| 6,208,102 B1 * | 3/2001 | Kikuchi et al. | 318/466 |
| 6,794,837 B1 * | 9/2004 | Whinnery et al. | 318/282 |
| 2004/0065498 A1 * | 4/2004 | Onozawa et al. | 180/286 |

FOREIGN PATENT DOCUMENTS

EP  0 981 457  3/2000

* cited by examiner

*Primary Examiner*—Khoi Tran
*Assistant Examiner*—Stephen Holwerda
(74) *Attorney, Agent, or Firm*—Michael J. Striker

(57) ABSTRACT

A device and a sliding roof system for displacing a movable part (16), in which the part (16) is displaceable in a setpoint displacement range (60) between two end positions (62, 64) with a motor-driven drive unit (24), and the displacement position of the part (16) can be sensed using an electronic unit (50) of the drive unit (24), and, in an emergency displacement mode, the part (16) is manually displaceable; an action range (68, 70) is located at least one end position (62, 64) outside of the setpoint displacement range (60), and the electronic unit (50) is used to monitor whether the part (16) enters the action range (68, 70) in order to subsequently initiate a calibration or recalibration of the drive unit (24) and/or to prevent further displacement in the action range (68, 70).

18 Claims, 1 Drawing Sheet

METHOD FOR DISPLACING A MOVABLE PART AND SLIDING ROOF SYSTEM FOR CARRYING OUT SUCH A METHOD

BACKGROUND OF THE INVENTION

The present invention relates to a method for displacing a movable part and a sliding roof system for a motor vehicle for carrying out such a method.

A drive device is made known in EP 981457 B1, with which a movable part of a motor vehicle is displaced between two end positions using an electric motor. The electric motor includes a switching device with a switch wheel, on which the movement of the part between the two end positions is depicted on a circular track of maximum 360°. The drive device includes absolute position detection, with which, e.g., three tracks with specific switching thresholds corresponding to an absolute position within the displacement range between the two end positions are located on the switch wheel. With a drive device of this type, the displaceable part is displaced, e.g., manually in cases of emergency when the drive device is defective. After the drive device is repaired, the switching threshold of the switch wheel enables the drive device to recalibrate itself when it is restarted. For reasons of cost, a switch wheel should be eliminated when developing new displacement drives for the sliding roof. Absolute position detection via the switching threshold is therefore eliminated, so that, after a manual emergency intervention has been carried out to displace the sliding roof, this emergency intervention is not recognized, and a false position is therefore displayed during further operation.

SUMMARY OF THE INVENTION

In keeping with these objects and with others which will become apparent hereinafter, one feature of the present invention resides, briefly stated, in a method for displacing a movable part in a setpoint displacement range between two end positions using a motor-driven drive unit; the displacement position of the part can be sensed using an electronic unit of the drive unit, and, in an emergency displacement mode, the part can be displaced manually, wherein an action range is located outside the setpoint displacement range limited by the end positions and is defined at at least one end position outside of the setpoint displacement range, and the electronic unit is used to monitor whether the part enters the action range, in order to subsequently initiate a calibration or recalibration of the drive unit and/or to prevent further displacement in the action range.

The inventive method and the inventive sliding roof system have the advantage that, due to the formation of an action range at the end positions outside of the setpoint displacement range, the drive unit recognizes when the drive is no longer calibrated as a result of a manual emergency displacement intervention. When the displacement part enters the action ranges, it is therefore possible for a certain method to be initiated which calibrates the drive unit, in order to ensure correct position detection and, in particular, correction of the absolute position of the moveable part.

It is particularly advantageous to define tolerance ranges—in addition to the action ranges—which are directly next to the end positions, in which it is ensured that position detection still functions unequivocally. To this end, the tolerance ranges favorably include a distance from the mechanical stops of the frame for the movable part.

It is particularly favorable to design the action ranges and tolerance ranges on both sides between the end positions and the associated mechanical end stops, and outside of the setpoint displacement range, so that a manual emergency displacement carried out when the part is completely closed or completely open is detected by the electronic unit.

In the normal operating mode, when the part is displaced using the motor, and one of the two end positions is approached, the movable part always remains in the normal displacement range or in the tolerance ranges associated with the end positions. The drive unit is actuated in a manner such that, in the normal, motor-driven operating mode, the movable part does not enter the action ranges. When the movable part enters the action ranges, this can therefore be interpreted unequivocally as an emergency displacement mode of the movable part.

When the drive motor of the drive unit fails, it is particularly favorable to continue supplying energy to the electronic unit, so that position detection continues to function during the manual emergency displacement mode. If the electronic unit remains electrically operable, it can therefore sense when the movable part enters the action range. Via the inventive design of the action ranges, it is possible to eliminate absolute position detection of the drive unit, e.g., using a switch wheel. A position detection system which is more cost-favorable can therefore be implemented, in the case of which detection of an absolute displacement position, e.g., the home position of the sliding-lifting-sunroof, can be eliminated. As a result, the manufacturing costs of the switch wheel and the reduction gear required therefor can be spared. When the movable part is mechanically coupled with the drive unit in the emergency displacement mode, it can be ensured that, in the normal displacement mode, the position can also be sensed correctly when displacement is carried out manually.

Position detection can be carried out, e.g., using a simple magnetic signal transducer which interacts with an associated magnetic sensor. According to a particularly cost-favorable design, a signal transducer can be located directly on the armature shaft of the drive motor, the signal transducer interacting with a signal receiver which is non-rotatably connected with the drive unit.

Favorably, finger protection can be eliminated in the action ranges, since the movable part is only displaced manually in the action ranges. Finger protection functions are preferably also eliminated in the tolerance ranges, thereby making it necessary to detect a "pinched" state only in the normal displacement range.

By defining the action ranges, different method sequences for recalibrating the drive can be specified via the electronic unit. For example, it can be specified that the movable part should be moved toward a mechanical end stop for recalibrating immediately or with delay (after the emergency displacement key has been removed), or not until immediately before the next displacement procedure in the normal operating mode.

The position sensor system necessarily remains electrically functional in the emergency displacement mode as well, to ensure detection of the movable part entering the action range. To this end, the electronic unit can include, e.g., an electrical accumulator, or it can be specified that the position sensor system will still be supplied with electrical power if the displacement motor fails.

The inventive method proves to be particularly advantageous for use in a sliding roof system for a motor vehicle. In this system, the movable parts which can be displaced are the sliding roof, to close the roof opening, or sun shields or guide rails of a sun shade. If a manual displacement mode becomes necessary because the displacement drive has failed, this is detected by the electronic unit, and the drive unit is recalibrated as soon as it becomes operable again. The manual displacement mode can be carried out, e.g., using an emergency crank or by displacing the movable part directly by hand.

BRIEF DESCRIPTION OF THE DRAWING

Exemplary embodiments of the present invention are presented in the drawing and are described in greater detail in the description below.

DESCRIPTION OF THE PREFERRED EMBODIMENTS

Figure 1:
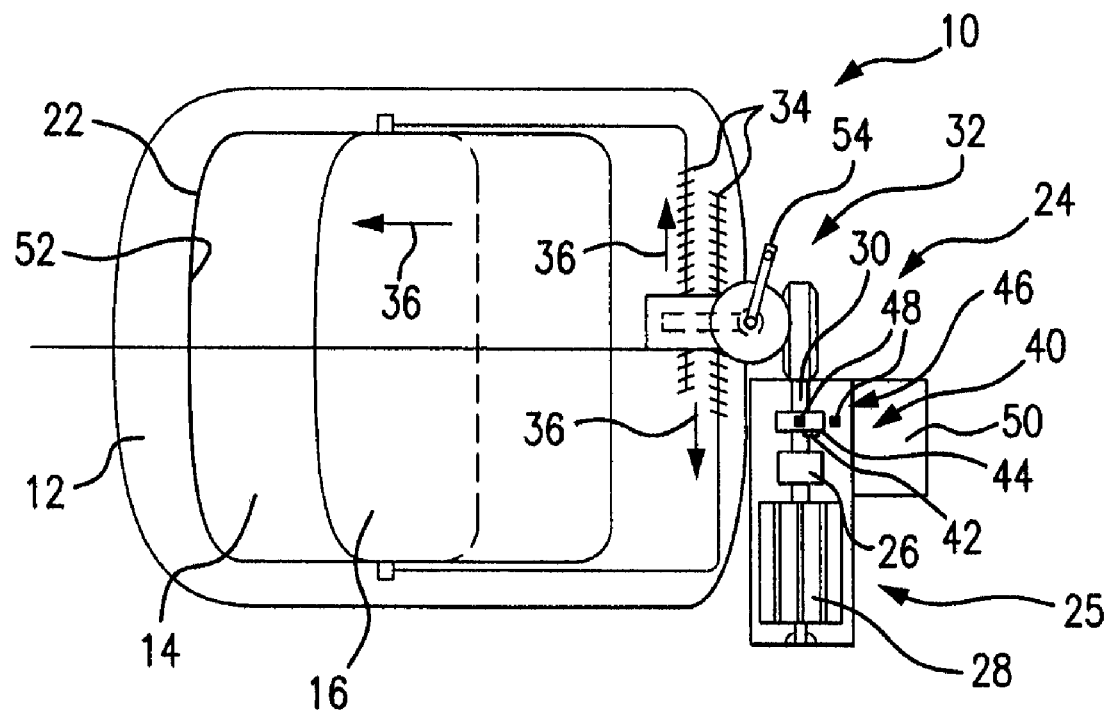
FIG. 1 shows an inventive sliding roof system for carrying out the inventive displacement method.

FIG. 1 shows a sliding roof system (10), with which an opening (14) is formed in a motor vehicle roof (12); opening (14) can be closed using a movable part. In this depiction, movable part (16) is designed as a sliding roof, which is guided in a frame (22) of opening (14). As further movable parts (16), a sun shield or a component of a sun shade can be displaced between end positions (62, 64). Movable part (16) is moved by a motor-driven drive unit (24), which is designed as an electric motor (25). If drive unit (24) is supplied with current via a commutator (26), for example, an armature (28) located on an armature shaft (30) is started rotating. Armature shaft (30) is coupled mechanically with movable part (16) via a gearbox unit (32), which is designed, e.g., as a worm gear pair. To this end, movable part (16) is connected, e.g., with lifting coils (34) which are displaced using gearbox unit (32) in order to displace part (16) as indicated by arrow (36) in FIG. 1

Drive unit 24 includes a position sensor system 40 for detecting the position of movable part 16. In the exemplary embodiment, a magnetic signal transducer 42—designed, e.g., as a ring magnet 44—is located on armature shaft 30. A signal receiver 46 is located diametrically opposed to signal transducer 42, which is formed by two separated Hall sensors 48 in the exemplary embodiment. Signal receiver 46 is connected with an electronic unit 50 of drive unit 24. When part 16 is displaced, position sensor system 40 generates an incremental signal, which is evaluated accordingly in electronic unit 50. Position sensor system 40 does not include home position detection. To calibrate drive unit 24, therefore, part 16 is moved, e.g., up against a stationary mechanical stop 52—which is formed by frame 22 in the exemplary embodiment—when opening 14 is closed completely.

If motor-driven drive unit 24 is defective, part 16 can be closed in a manual emergency displacement mode, e.g., to prevent rain from entering. To do this, e.g., an emergency crank 54 is inserted in gearbox unit 32 in order to actuate it manually. As an alternative, movable part 16 can be displaced directly by hand. The emergency displacement mode is designed such that motor-driven drive unit 24 also remains coupled with movable part 16 in a mechanically unequivocal manner while it is being displaced manually. In the exemplary embodiment, it is also ensured that, if motor-driven drive unit 24 is defective, electronic unit 50—at the least—is supplied via an emergency power supply. Position sensor system 40 can therefore also sense the position of part 16 in the manual emergency displacement mode.

Figure 2:
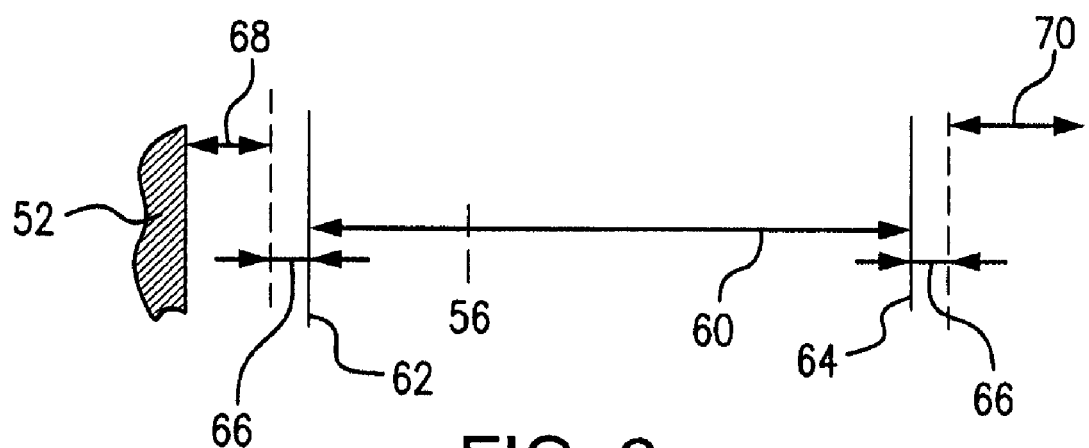
FIG. 2 is a schematic illustration of a depiction of the different ranges of the displacement method.

A setpoint displacement range 60 of this type is depicted schematically in FIG. 2, and it is limited by a first end position 62 and a second end position 64. End position 62 corresponds to the closed state, and end position 64 corresponds to the opened state of opening 14. Outside of setpoint displacement range 60, tolerance ranges 66 are located on both sides of end positions 62, 64; if part 16 moves slightly past end positions 62, 64, this is tolerated without affecting the calibration of drive unit 24. In addition, action ranges 68 and 70 are located on both sides, outside of setpoint displacement range 60, which part 16 does not enter when it is displaced via motor-driven drive unit 24. First action range 68, which, in first end position 62—"closed"—is located outside of setpoint displacement range 60, is limited, e.g., by stationary stop 52, which can also be contacted in order to recalibrate motor-driven drive unit 24. Second action range 70, in end position 64—"open"—is not limited, for example, on the side facing away from end position 64. If part 16 is now moved by hand, in the manual emergency displacement mode, past end positions 62 or 64 and past tolerance ranges 66 and 68, part 16 enters first action range 68 and/or second action range 70. Electronic unit 50 detects the fact that part 16 has entered action ranges 68, 70. As a result, electronic unit 50 initiates an action program which ensures that motor-driven drive unit 24 is recalibrated correctly for the next motor-driven displacement procedure within setpoint displacement range 60. This can take place, e.g., by automatically moving part 16 against stationary stop 52 for recalibration as soon as motor-driven drive unit 24 becomes operable again, or as soon as another displacement command is issued to displace the part in setpoint displacement range 60. This means electronic unit 50 "automatically" senses that part 16 was moved in the emergency displacement mode as soon as part 16 is located in one of the action ranges 68 or 70. Drive unit 24 is decalibrated and transferred to an initializing state. In the recalibration, setpoint displacement range 60, tolerance ranges 66 and action ranges 68, 70 may need to be relearned and stored in electronic unit 50.

It should be noted that, with regard for the exemplary embodiments presented in the figures and the description, many different combinations of the individual features are possible. For example, tolerance ranges 66 can be eliminated, or an action range can be defined on only one side of setpoint displacement range 60. User-specific program sequences can be stored in electronic unit 50, which are activated as soon as part 16 enters one of the action ranges 68 or 70. Motor-driven drive unit 24 is not limited to an electric motor 25, and position sensor system 40 can be designed, e.g., as an optical system, or it can be sensed via the waviness of the motor current. The inventive displacement method is preferably used for motor vehicle sliding sunroofs 10, particularly for "panorama roofs". Several sliding sunroofs 18 can also be displaced simultaneously, which are moved into a lifted position, e.g., when displaced within setpoint displacement range 60 to a lifting point 56. As a further variation, a sliding sunroof includes a lifting point 56 which coincides with the "open" end position 64.

What is claimed is:

1. A method for displacing a movable part (16) in a setpoint displacement range (60) between two end positions (62, 64) using a motor-driven drive unit (24); the displacement position of the part (16) can be sensed using an electronic unit (50) of the drive unit (24) in normal operating mode and in emergency displacement mode, and, during operation in emergency displacement mode, the part (16) can be displaced manually, wherein an action range (68, 70) is located outside the setpoint displacement range (60) limited by the end positions (62, 64) and is defined at at least one end position (62, 64) outside of the setpoint displacement range (60), and wherein the electronic unit (50) monitors whether the part

(16) enters the action range (68, 70), whereupon the electronic unit (50) at least one of initiates calibration or recalibration of the drive unit (24) and prevents further displacement in the action range (68, 70).

2. The method as recited in claim 1, wherein an additional tolerance range (66) is defined between the at least one end position (62, 64) and the action range (68, 70) adjacent to the at least one end position which permits a certain deviation of the part (16) from the end position (62, 64), which is activated, without the drive unit (24) being recalibrated as a result.

3. The method as recited in claim 1, wherein an action range (68, 70) and/or a tolerance range (66) are located in both end positions (62, 64) outside of the setpoint displacement range (60).

4. The method as recited in claim 1, wherein the at least one action range (68, 70) on the side facing away from the end position (62, 64) is limited by a mechanical stop (52) for the part (16) to be displaced.

5. A method for displacing a movable part (16) in a setpoint displacement range (60) between two end positions (62, 64) using a motor-driven drive unit (24); the displacement position of the part (16) can be sensed using an electronic unit (50) of the drive unit (24) in a normal operating mode and in an emergency displacement mode, and, during operation in the emergency displacement mode, the part (16) can be displaced manually, wherein an action range (68, 70) is located outside the setpoint displacement range (60) limited by the end positions (62, 64) and is defined at at least one end position (62, 64) outside of the setpoint displacement range (60), wherein the electronic unit (50) monitors whether the part (16) enters the action range (68, 70), whereupon the electronic unit (5) at least one of initiates calibration or recalibration of the drive unit (24) and prevents further displacement in the action range (68, 70), and wherein the part (16) enters the action range (68, 70) only when the emergency displacement mode, which is manual, is actuated.

6. The method as recited in claim 1, wherein the motor of the drive unit (24) is not activated during the manual emergency displacement mode, and the part (16) is coupled mechanically —with the motor of the drive unit (24) during the manual displacement.

7. The method as recited in claim 1, wherein the position of the part (16) is sensed using an incremental position sensor system (40) without home position detection.

8. The method as recited in claim 1, wherein the drive unit (24) is designed as an electric motor (25) with an armature shaft (30), and a signal transducer (42) is located on the armature shaft (30), and a signal receiver (46) is located diametrically opposite to the signal transducer (42).

9. The method as recited in claim 1, wherein the part (16) is only monitored in the setpoint displacement range (60) for occurrences of pinching, while a finger protection function is not provided in the action ranges (68, 70) and/or tolerance ranges (66).

10. A method for displacing a movable part (16) in a setpoint displacement range (60) between two end positions (62, 64) using a motor-driven drive unit (24); the displacement position of the part (16) can be sensed using an electronic unit (50) of the drive unit (24)) in a normal operating mode and in an emergency displacement mode, and, during operation in the emergency displacement mode, the part (16) can be displaced manually, wherein an action range (68, 70) is located outside the setpoint displacement range (60) limited by the end positions (62, 64) and is defined at at least one end position (62, 64) outside of the setpoint displacement range (60), wherein the electronic unit (50) monitors whether the part (16) enters the action range (68, 70), whereupon the electronic unit at least one of initiates a calibration or recalibration of the drive unit (24) and prevents further displacement in the action range (68, 70), and wherein, when the part (16) enters one of the action ranges (68, 70), a certain program sequence is activated in the electronic unit (50), which calibrates or recalibrates the drive unit (24) for a new displacement procedure in the setpoint displacement range (60), and/or it prevents a further displacement in the action range (68, 70).

11. The method as recited in claim 1, wherein, in the emergency displacement mode, a position sensor system (40) remains electrically functional via the electronic unit (50).

12. A sliding roof system for a motor vehicle, comprising a movable part (16) displaceable in a setpoint displacement range (60) between two end positions (62, 64); a motor-driven drive unit (24) displacing the movable part, the drive unit provided with an electronic unit for sensing a displacement position of the part (16)) in a normal operating mode and in an emergency displacement mode, and during operation in an emergency displacement mode, the part (16) is displaceable manually, with an action range (68, 70), which is located outside the setpoint displacement range (60) limited by the end positions (62, 64) and is defined at at least one end position (62, 64) outside of the setpoint displacement range (60), and wherein the electronic unit (50) is configured to monitor whether the part (16) enters the action range (68, 70), whereupon the electronic unit (50) at least one of initiates calibration or recalibration of the drive unit (24) and prevents further displacement in the action range (68, 70).

13. The method as recited in claim 1, wherein the part (16) when it is displaced via the drive unit (24) does not enter the action range (68, 70).

14. The method as recited in claim 1, wherein the end position (62) corresponds to a closed state, and the end position (64) corresponds to an opened state of an opening (14) closeable by the part (16).

15. The method as recited in claim 4 wherein the mechanical stop (52) is configured as a frame.

16. The method as recited in claim 6, wherein the part (16) is coupled mechanically via a gearbox unit (32) of the drive unit (24).

17. The method as recited in claim 8, wherein the signal transducer (42) is configured as a ring magnet (44).

18. The method as recited in claim 8, wherein the signal receiver (46) is configured as a Hall sensor system (48).

* * * * *